United States Patent [19]
Phillips

[11] Patent Number: 5,600,893
[45] Date of Patent: Feb. 11, 1997

[54] PROCESS AND SYSTEM FOR MEASURING ALIGNMENT OF AUTOMOTIVE VEHICLE SUSPENSION

[76] Inventor: Robert Phillips, 17 N. Cross Rd., Staatsburg, N.Y. 12580

[21] Appl. No.: 503,977

[22] Filed: Jul. 19, 1995

[51] Int. Cl.$^6$ ................................................. G01B 11/275
[52] U.S. Cl. ........................... 33/203.18; 33/288; 356/155
[58] Field of Search ............................. 33/203.18, 288, 33/286, 293, 203.19, 203.12, DIG. 21; 356/155, 448, 229

[56] References Cited

U.S. PATENT DOCUMENTS

| | | | |
|---|---|---|---|
| 2,410,339 | 10/1946 | Creagmile | 88/74 |
| 2,470,090 | 5/1949 | Carrigan et al. | 88/14 |
| 2,496,324 | 2/1950 | Wilson | 88/14 |
| 2,641,957 | 6/1953 | Vandermeer | 88/14 |
| 2,656,762 | 10/1953 | Carr | 88/74 |
| 2,667,805 | 2/1954 | Carr | 88/14 |
| 2,700,319 | 1/1955 | Carr | 88/14 |
| 3,288,020 | 11/1966 | Lill | 88/14 |
| 3,363,504 | 1/1968 | Lill | 88/14 |
| 3,501,240 | 3/1970 | Haynes | 356/155 |
| 3,756,724 | 9/1973 | Schirmer | 356/155 |
| 3,876,310 | 4/1975 | Berndt | 356/155 |
| 3,951,551 | 4/1976 | Macpherson | 356/155 |
| 4,466,196 | 8/1984 | Woodruff | 33/288 |

Primary Examiner—Christopher W. Fulton
Attorney, Agent, or Firm—DeLio & Peterson

[57] ABSTRACT

A method of aligning a suspension of an automotive vehicle, the vehicle having a chassis secured at a predetermined height above the ground, a steering shaft secured to prevent movement thereof, and a hub, the method comprising the steps of providing a suspension measurement system comprising a light source, a reflector and a target, adjusting the height of the suspension to a height above the ground that is substantially equal to a radius of a tire used with the suspension, removably attaching the reflector to the hub wherein the reflector is vertically oriented and substantially perpendicular to the hub central axis, positioning the target a predetermined distance from the reflector, directing a light beam to the center of the reflector for reflection onto the target, the light source being positioned such that the reflected beam of light is substantially coplanar with the directed light beam, incrementally adjusting the height of the suspension in relation to an initial height and applying indicia to locations on the target to which the reflected light beam moves, each indicia corresponding to a height of the suspension that is above or below the initial height, and measuring a distance in a first orientation between a pair of indicia having the greatest first orientation distance therebetween, in comparison to any other pairs of indicia.

19 Claims, 2 Drawing Sheets

PROCESS AND SYSTEM FOR MEASURING ALIGNMENT OF AUTOMOTIVE VEHICLE SUSPENSION

BACKGROUND OF THE INVENTION

1. Field of the Invention

The present invention relates to an apparatus for measuring the alignment of the suspension of an automotive vehicle.

2. Problem to be Solved

Precise alignment of automotive vehicle suspensions is critical especially when the vehicles are designed for racing, such as Formula-I or Indy-type racing cars. Typically, such racing cars reach speeds in excess of 150 miles per hour during a race. In fact, during the past few years, Indy-type racing cars have reached speeds in excess of 200 miles per hour during time trials for determining pole positions. At these high speeds, toe travel and/or camber angle deviation of even a 1/10 inch can result in loss of control of the racing car. Camber deviation is the movement of the top of the tire into or out of (tilting points) the wheel well of the car.

Conventional processes and systems for measuring vehicle suspension alignment provide accuracy that is limited by the accuracy of the individual components used in the system. Additionally, conventional systems typically provide toe and camber data based on an average sized tire and not the tire actually used on the particular suspension that is being tested. Furthermore, conventional systems cannot provide measurements of toe and camber distances to a high degree of accuracy, e.g. one-millionth of an inch, which may be required for modern high-technology suspension systems.

Bearing in mind the problems and deficiencies of conventional processes and systems for measuring vehicle suspension alignment, it is an object of the present invention to provide a process and system for measuring the alignment of an automotive vehicle suspension wherein the accuracy of the measurements obtained with the process and system is substantially controlled by the user of the process and system and not by the accuracy of the components used in the system.

It is another object of the present invention to provide a process and system for measuring the alignment of an automotive vehicle suspension wherein the measurements obtained are based on the size of the tire actually used with the particular suspension.

It is a further object of the present invention to provide a process and system for measuring the alignment of an automotive vehicle suspension that can measure suspension alignment to a degree of accuracy significantly higher than that provided by conventional alignment measurement processes and systems.

It is another object of the present invention to provide a process and system for measuring the alignment of an automotive vehicle suspension that can be manufactured at a reasonable cost.

Other objects and advantages of the invention will in part be obvious and will in part be apparent from the specification.

SUMMARY OF THE INVENTION

The above and other objects and advantages, which will be apparent to one skilled in the art, are achieved in the present invention which is directed to, in a first aspect, a method of aligning a suspension of an automotive vehicle, the vehicle having a chassis secured at a predetermined height above the ground, a steering shaft secured to prevent movement thereof, and a hub having a central axis, the method comprising the steps of:

a) providing a suspension measurement system comprising a light source, a reflector and a target;

b) adjusting the height of the suspension to a height above the ground that is substantially equal to a radius of a tire used with the suspension;

c) removably attaching the reflector to the hub, the reflector being vertically oriented and substantially perpendicular to the hub central axis;

d) positioning the target a predetermined distance from the reflector;

e) directing a light beam to the center of the reflector for reflection onto the target, the light source being positioned such that the reflected beam of light is substantially coplanar with the directed light beam and passes over the light source;

f) incrementally adjusting the height of the suspension in relation to an initial height and applying indicia to locations on the target to which the reflected light beam moves, each indicia corresponding to a height of the suspension that is above or below the initial height; and g) measuring a distance in a first orientation between a pair of indicia having the greatest first orientation distance therebetween, in comparison to any other pairs of indicia.

The method further includes the steps of:

h) determining a distance that is closest to the distance measured in step (g) and which corresponds to the predetermined distance between the reflector and the target;

i) determining the degrees of angular tire movement that corresponds to the distance determined in step (h);

j) determining a diameter of the tire used with the suspension; and k) determining a distance representing movement of the tire and which corresponds to the degrees determined in step (i) and the tire diameter determined in step (j).

When the first orientation is substantially horizontal, the distance determined in step (k) represents toe travel of the tire used with the suspension. When the first orientation is substantially vertical, the distance determine in step (k) represents the camber deviation of the tire used with the suspension.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

In describing the preferred embodiment of the present invention, reference will be made herein to FIGS. 1–3 of the drawings in which like numerals refer to like features of the invention.

Figure 1:
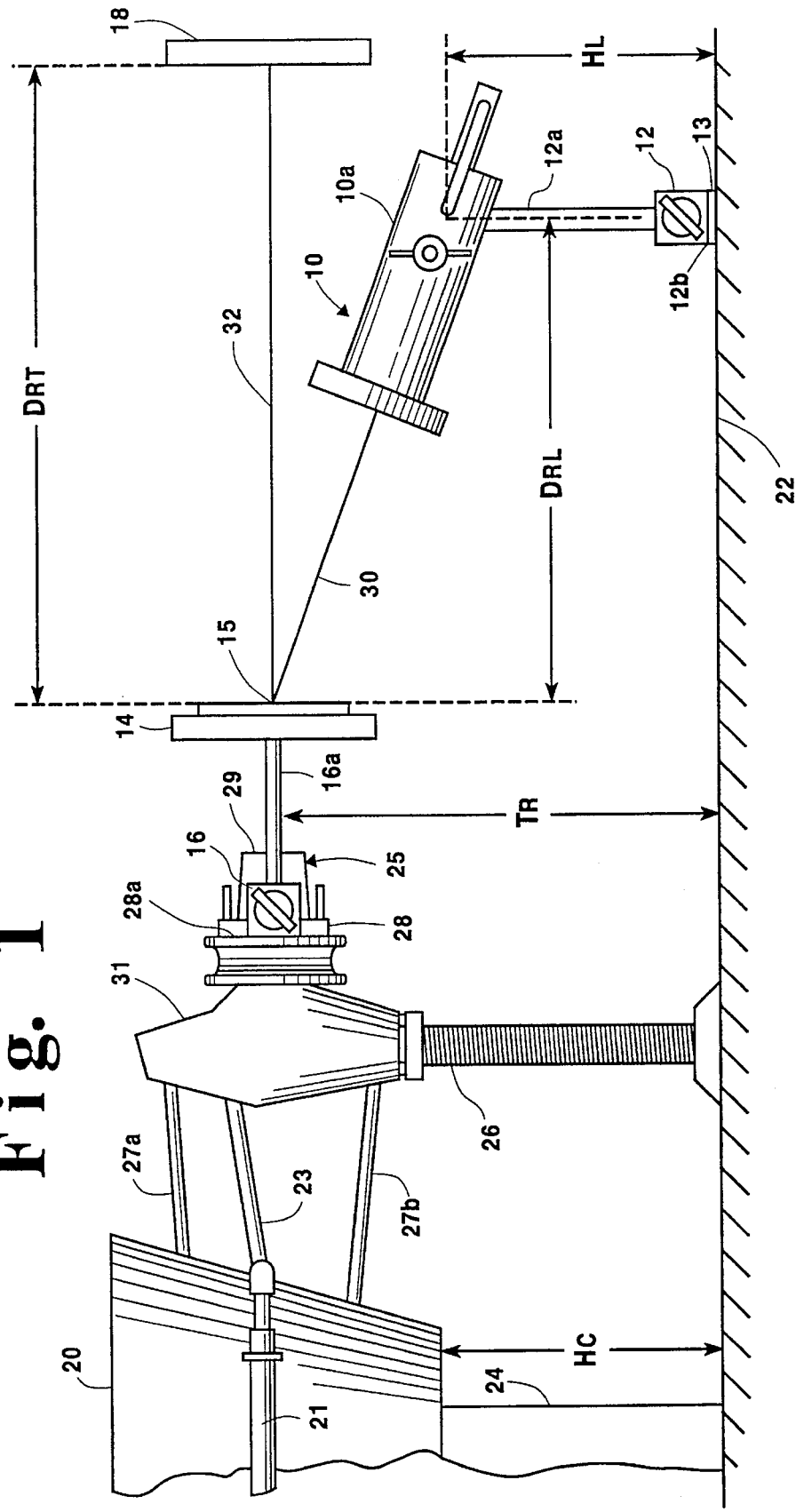
FIG. 1 is diagrammatical view of the suspension alignment measurement system of the present invention and a suspension with which the measurement system is to be used.

Referring to FIG. 1, the automotive vehicle includes chassis 20, rack and pinion steering 21, steering tie rod 23, hub 25, upper and lower control arms 27a and 27b, respectively, rotor-brake 28 and spindle 31.

The automotive vehicle suspension alignment system of the present invention comprises light source 10, magnetic base 12, support plate 13, reflector 14, magnetic base 16 and target 18. Magnetic bases 12 and 16 include shafts 12a and 16a, respectively. In a preferred embodiment, shaft 12a and 16a have lengths of about 7 (seven) inches. Light source 10 includes housing 10a which is removably mounted to shaft 12a of base 12. In a preferred embodiment, light source 10 is a low power laser having an output power of about a few milliwatts. Reflector 14 has a uniform and continuous reflective surface and in a preferred embodiment, is a mirror. In a preferred embodiment, target 18 is a non-reflective target and has a flat, firm surface to facilitate marking with a pen or pencil or placing other indicia thereon. In a preferred embodiment, target 18 is comprised of graph paper with about 1/10 inch grid and is mounted on a substantially flat surface. However, other suitable materials may be used such as cardboard or wallboard. The function of these components will be discussed in detail below in the ensuing description of the process of present invention.

Preferably, the following preliminary steps are implemented in order to accurately measure the toe travel and camber angle deviation:

(a) The first step requires making the car race-ready: (i) setting all fluid levels according to racing requirements, (ii) setting the tire pressures according to race requirements, and (iii) adding the weight of the driver to the car. This last step can also be accomplished by having the driver sit in the car while the measurements are being taken.

(b) Referring to FIG. 1, the next step entails measuring the height of chassis 20 above ground 22 and securing the chassis at this height. This height is referred to as the chassis height and is designated by $H_C$. Any safe system can be used to secure chassis 20 at height $H_C$ such as block 24.

(c) The next step entails the removal of the wheels or tires, shocks and springs associated with the particular suspension that is to undergo measurement.

(d) The steering shaft of the vehicle is then secured so as to prevent it from moving. Any movement of the steering shaft movement may produce erroneous measurements. Any suitable device may be used to secure the steering shaft. For example, a Vise-Grip clamped to the shaft and secured with a hose clamp may be one method.

(e) The next step entails measuring the radius of the tire that is used with the particular suspension. The tire radius is designated by $T_R$ as shown in FIG. 1.

(f) Referring to FIG. 1, hub 25 is positioned, via jack 26, so that the hub central axis is substantially positioned at a height above the ground that is equal to tire radius $T_R$. This step may also be implemented with any suitable lifting device.

After the above preliminary steps have been implemented, the following steps are implemented to effect measurement of the toe travel and camber angle deviation.

(g) Referring to FIG. 1, magnetic base 16 is preferably magnetically attached to rotor-brake 28 at surface 28a at approximately the nine o'clock or three o'clock positions such that shaft 16a of base 16 is substantially parallel to the central axis of hub 25. Although this is the preferred position of magnetic base 16, base 16 can be positioned on any surface of hub 25 or rotor-brake 28 provided that shaft 16a is substantially perpendicular to rotor-brake surface 28a and positioned at a known height above ground 22.

(h) Reflector 14 is then removably attached to the end of shaft 16a. Reflector 14 is vertically oriented in a manner such that the plane of reflector 14 is substantially perpendicular to shaft 16a and the hub central axis. Reflector 14 is preferably removably secured to the end of shaft 16a via a thumb screw. However, any other temporary securing means could be used to secure reflector 14 to the end of shaft 16a provided that such securing means does not cause discontinuities in the uniform reflective surface of reflector 14. It is highly preferable that reflector 14 and magnetic base 16 are attached to surface 28a and shaft 16a, respectively, in a manner such that there is substantially no independent movement of reflector 14 and shaft 16a. Any independent movement of reflector 14 and shaft 16a may result in erroneous toe travel and camber angle measurements.

If the vehicle in question uses floating brake-rotors, then other means must be used to secure shaft 16a. For example, a spindle nut may be attached to shaft 16a so the shaft can be attached, via the spindle nut, to spindle 31. If the vehicle uses wheel studs, then a threaded coupling can be made with the thread of the wheel stud on one end, and the thread of magnetic base 16 on the other end.

(i) Referring to FIG. 1, support base or plate 13 is positioned on ground 22. Preferably, base 13 is fabricated from metal, has a thickness of at least ¼ inch and has a length and width of at least 6 inches (36 sq. in.). In a preferred embodiment, support plate 13 is center-lined-spaced about 4 feet from reflector 14, as designated by $D_{RC}$. Magnetic base 12 is then magnetically attached to base 13. If ground 22 is not substantially flat or even, then it is preferred that the plane of the bottom surface 12b of magnetic base 12 be substantially coplanar with the surface of the tire.

(j) Light beam source 10 includes housing 10a which is attached to the top end of shaft 12a. It is highly preferable that housing 10a is at a height that is equal to the tire radius minus 3 inches (indicated by $H_L$) so as to facilitate directing the light or laser beam to center point 15 of reflector 14 and so that reflected light beam 32 will be coplanar with beam 30 and directly over laser 10 (see FIG. 1). Magnetic base 12 may have to be adjusted so that light beam 30 is vertically and horizontally centered on reflector 14 and is directed to center point 15. If ground surface 22 is uneven or discontinuous, the position of magnetic base 12 or support base 13 may have to be adjusted via shims.

(k) Referring to FIG. 1, target 18 is positioned a predetermined distance $D_{RT}$ from reflector 14. The degree of accuracy of the toe travel and camber angle measurements depends on the distance $D_{RT}$. As $D_{RT}$ increases, the accuracy of the measurements also increases. Similarly, as $D_{RT}$ decreases, the accuracy of the measurements decrease. In a preferred embodiment, the distance $D_{RT}$ is between about 48 and 96 inches. However, the distance $D_{RT}$ may also be below 48 inches or above 96 inches. The actual distance $D_{RT}$ chosen depends on the desired accuracy of the measurements. If measurements are to be taken to an accuracy of 1/1,000,000 inch, then $D_{RT}$ would be increased to a distance that would provide such accuracy. Thus, it is preferred that the user first determine the required accuracy of the measurements that are to be taken.

Figure 2:
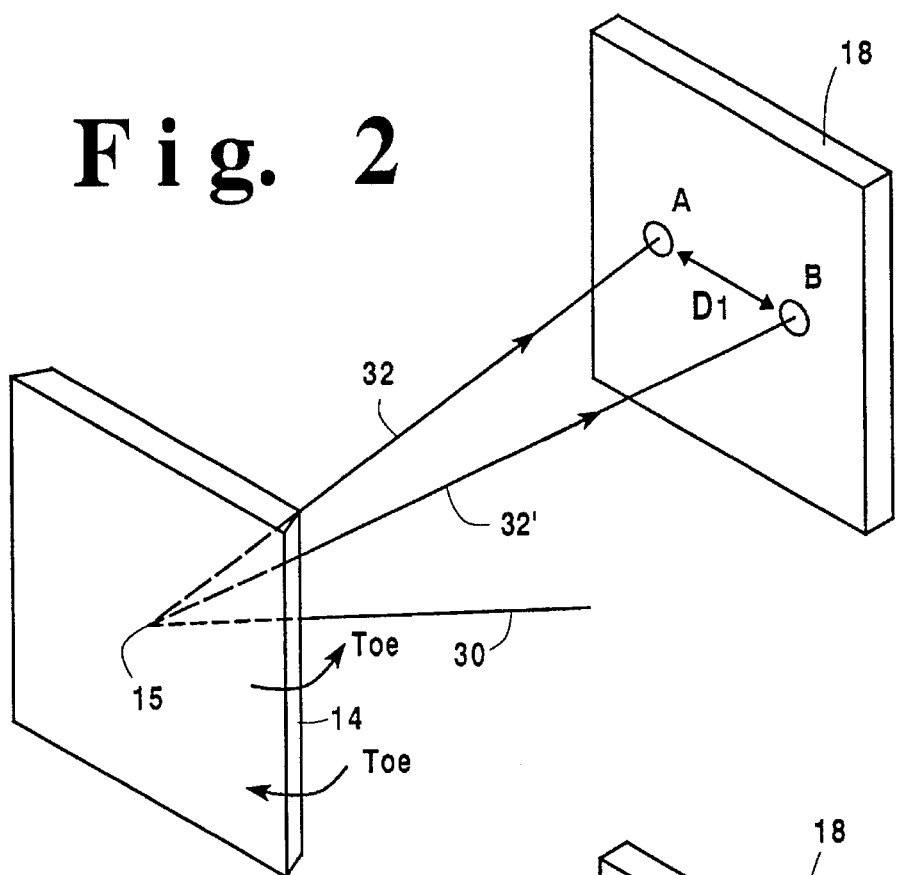
FIG. 2 is a diagrammatic view illustrating how toe travel affects the angle of reflection of a light beam generated by the light source depicted in FIG. 1.

(l) Referring to FIGS. 1 and 2, light source 10 is activated and beam 30 is directed to centerpoint 15 of reflector 14 which reflects beam 32 onto target 18. Indicia is then placed above the center of the light spot on target 18 created by beam 32. Preferably, the indicia is a pencil or pen mark. The first light spot is designated by the letter A and represents an initial position of the suspension being tested. Preferably, the initial position of the suspension is defined by the suspension hanging about two (2) inches below normal ride height. As used herein, the term "ride height" is defined as the height of the suspension when the vehicle is sitting in a normal position on the ground.

Figure 3:
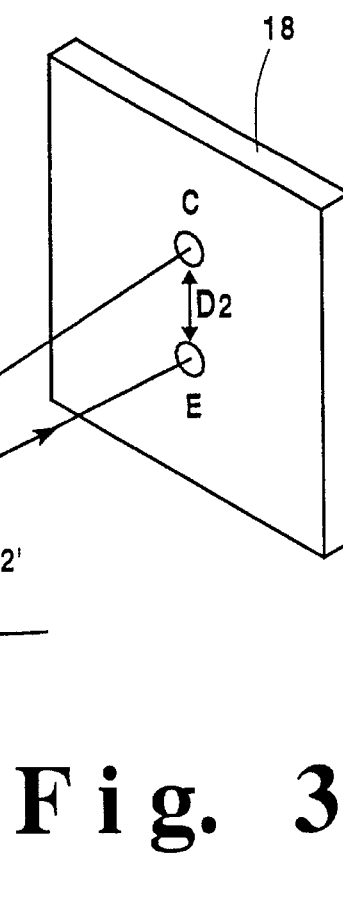
FIG. 3 is a diagrammatic view illustrating how camber angle deviation affects the angle of reflection of a light beam generated by the light source depicted in FIG. 1.

(m) Referring to FIGS. 1–3, the position of the suspension is then changed and the distance measured between the location on target 18 where the light spot initially appeared and the location to where the spot moved as a result of the movement of the suspension. Jack 26 or any other suitable lifting device may be used to accomplish this step. Preferably, the suspension is raised or lowered in one (1) inch increments. At each increment, the light beam spot on target 18 is marked with indicia. Any change in toe results in substantially horizontal movement of the light beam spot. For example, the suspension may be raised to a position that is about two (2) inches above ride height to simulate a two (2) bump position. If the geometry of the suspension is such that the steering changes as a result of raising (or lowering) the suspension, reflector 14 moves as a result of the change in the steering position. Movement of reflector 14 changes the direction of reflection of beam 30 and thus, reflects beam 32' onto target 18 thereby causing the light spot to move to position B (see FIG. 2). Target 18 is stationary at all times during the measurement of the alignment of the suspension.

(n) Referring to FIG. 2, the distance $D_1$ is then measured between marks A and B. When $D_1$ is determined, the toe travel may be found by using Table 1 below. Referring to FIG. 3, the distance $D_2$ is also measured between marks C and E. When this distance is determined, the camber angle deviation may be found by using Table 1 below. If the suspension is moved to more than two (2) positions, then there will be more than two (2) indicia marks on target 18. In such a case, $D_1$ is measured between the pair of indicia having the greatest horizontal distance therebetween, and $D_2$ is measured between the pair of indicia having the greatest vertical distance therebetween.

(o) The user then aligns the suspension so as to reduce the toe travel and camber angle deviation parameters determined from the aforementioned steps. The user may then repeat steps (g)–(n) to determine if the toe travel and camber angle deviation parameters of the suspension are within predetermined tolerances determined by the user.

EXAMPLE

The following example will illustrate how toe travel and camber angle deviation may be determined from Table 1 shown below based on the following data:

| 1) Distance between reflector 14 and target 18: | 60 inches. |
|---|---|
| 2) Tire diameter: | 22 inches. |
| 3) $D_1$ | 0.1 inch. |
| 4) $D_2$ | 0.066 inch. |

In order to determine toe travel and camber angle deviation, the following steps are implemented:

i). Locate a number in the column entitled "DISTANCE" in Table 1 that is equal to the distance between reflector 14 and target 18. This was already determined to be 60 inches.

ii). Locate numbers in the column under "60 inches" that are the closest to the distances $D_1$ and $D_2$. The numbers closest to $D_1$ and $D_2$ are 0.105 and 0.063, respectively.

iii). Locate numbers in the column entitled "DEGREES" that are in the same rows as 0.105 and 0.063. As shown in Table 1, 0.05 degrees corresponds to 0.105 and represents the number of degrees between positions A and B on target (see FIG. 2), and 0.025 corresponds to 0.063 and represents the number of degrees between positions C on E and target 18 (see FIG. 3).

iv). Refer to the portion of Table 1 entitled "TIRE DIAMETER" and locate the appropriate range of tire diameters. In this case, the appropriate range is 21–23 since the diameter of the tire on the suspension tested is 22 inches. Numbers representing distances in inches are then located under the column "21–23" that are in the same rows as 0.05 and 0.025 degrees. As shown in Table 1, 0.010 inch corresponds to 0.05 degrees and represents the toe travel, and 0.005 inch corresponds to 0.025 degrees and represents the deviation in camber angle.

TABLE 1

| DISTANCE | | | | | TIRE DIAMETER | | |
|---|---|---|---|---|---|---|---|
| 48° | 60° | 72° | 84° | DEGREES | 18–20 | 21–23 | 24–26 |
| .042 | .052 | .063 | .073 | .025 | .004 | .005 | .006 |
|  | .084 | .105 |  | .050 |  | .010 | *** |
| .126 | *** | *** | *** | *** | *** | *** | *** |

Thus, the present invention provides a process and system for measuring vehicle suspension parameters wherein:

a) the user of the process and system determines the accuracy of the measurements to be taken by choosing a distance between reflector 14 and target 18 that corresponds to a desired accuracy;

b) toe travel and camber angle deviation are based on the size of the actual tire used with the particular suspension;

c) toe travel and camber angle can be measured to an accuracy of up to 1/1,000,000 inch; and d) the system comprises a relatively low component count and can be easily assembled.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of aligning a suspension of an automotive vehicle, the vehicle having a chassis secured at a predetermined height above the ground, a steering shaft secured to prevent movement thereof, and a hub, said method comprising the steps of:
   a) providing a suspension measurement system comprising a light source, a reflector and a target;
   b) adjusting the height of the suspension to a height above the ground that is substantially equal to a radius of a tire used with the suspension;
   c) removably attaching said reflector to the hub, said reflector being vertically oriented and substantially perpendicular to the hub central axis;
   d) positioning the target a predetermined distance from said reflector;
   e) directing a light beam to the center of said reflector for reflection onto said target, said light source being positioned such that the reflected beam of light is substantially coplanar with the directed light beam;
   f) incrementally adjusting the height of the suspension in relation to an initial height and applying indicia to locations on said target to which the reflected light beam moves, each indicia corresponding to a height of the suspension that is above or below the initial height; and
   g) measuring a distance in a first orientation between a pair of indicia having the greatest first orientation distance therebetween, in comparison to any other pairs of indicia.

2. The method of claim 1 further including the step of measuring a distance in a second orientation between a pair of indicia having the greatest second orientation distance therebetween, in comparison to any other pairs of indicia.

3. The method of claim 1 wherein said first orientation is substantially horizontal.

4. The method of claim 1 wherein said first orientation is substantially vertical.

5. The method of claim 2 wherein said first orientation is substantially horizontal and said second orientation is substantially vertical.

6. The method of claim 1 further including the steps of:
   h) determining a distance that is closest to the distance measured in step (g) and which corresponds to said predetermined distance between said reflector and said target;
   i) determining the degrees of angular tire movement that corresponds to the distance determined in step (h);
   j) determining a diameter of the tire used with the suspension; and
   k) determining a distance representing movement of the tire and which corresponds to the degrees determined in step (i) and the tire diameter determined in step (j).

7. The method of claim 6 wherein said first orientation is substantially horizontal and the distance determined in step (k) represents toe travel of the tire used with the suspension.

8. The method of claim 6 wherein the first orientation is substantially vertical and the distance determine in step (k) represents the camber deviation of the tire used with the suspension.

9. The method of claim 1 wherein the predetermined distance between set reflector and set target is between about 48 and 96 inches.

10. The method of claim 1 wherein step (b) further includes the step of removing the wheels, shocks and springs from the vehicle.

11. The method of claim 1 wherein step (d) further includes the step of measuring the radius of the tire associated with the suspension.

12. The method of claim 6 further including the step of aligning the suspension in order to decrease the distance measured in step (k).

13. The method of claim 12 further including the step of repeating steps (a)–(k) in order to determine if the distance measured in step (k) is within a predetermined tolerance.

14. The method of claim 1 wherein said light source comprises a laser beam generator.

15. The method of claim 1 wherein said reflector comprises a mirror.

16. The method of claim 1 wherein said target is a non-reflective target.

17. The method of claim 1 wherein said target has a substantially flat surface.

18. The method of claim 17 wherein said target comprises graph paper having about a 1/10 inch grid.

19. The method of claim 1 wherein step (e) further includes the step of positioning said laser source at a height above the ground that is substantially equal to the radius of the tire minus three (3) inches.

* * * * *

UNITED STATES PATENT AND TRADEMARK OFFICE
CERTIFICATE OF CORRECTION

PATENT NO. : 5,600,893

DATED : February 11, 1997

INVENTOR(S) : Phillips

It is certified that error appears in the above-identified patent and that said Letters Patent is hereby corrected as shown below:

Column 6, line 47: Please delete "48° 60° 72° 84°" and substitute therefor -- 48" 60" 72" 84" --.

Signed and Sealed this

Sixth Day of May, 1997

Attest:

BRUCE LEHMAN

Attesting Officer

Commissioner of Patents and Trademarks